United States Patent [19]

Butler

[11] Patent Number: 4,555,376

[45] Date of Patent: Nov. 26, 1985

[54] MOLDING AN ELASTOMERIC RING WHILE BONDING IT TO A METAL CASE AND TO A FLUOROCARBON WASHER

[75] Inventor: John D. Butler, Van Wert, Ohio

[73] Assignee: Federal-Mogul Corporation, Southfield, Mich.

[21] Appl. No.: 588,718

[22] Filed: Mar. 12, 1984

[51] Int. Cl.⁴ .............................................. B29D 3/00
[52] U.S. Cl. .................................... 264/266; 29/469.5; 29/527.1; 156/245; 156/500; 264/268; 425/DIG. 47
[58] Field of Search ................................ 156/245, 500; 425/DIG. 47; 29/527.1, 469.5; 264/266, 268; 249/57, 83, 85, 88

[56] References Cited

U.S. PATENT DOCUMENTS

| | | | |
|---|---|---|---|
| 3,841,809 | 10/1974 | Tucker | 425/DIG. 47 |
| 3,985,487 | 10/1976 | Clark | 425/DIG. 47 |
| 3,993,420 | 11/1976 | Haas et al. | 425/DIG. 47 |
| 4,171,561 | 10/1979 | Bainard et al. | 264/268 |
| 4,406,847 | 9/1983 | O'Neal et al. | 264/266 |
| 4,464,322 | 8/1984 | Butler | 29/527.1 |

FOREIGN PATENT DOCUMENTS 4229067 7/1971 Japan .
WO80/01598 8/1980 PCT Int'l Appl. .

Primary Examiner—Caleb Weston
Attorney, Agent, or Firm—Lawrence J. Shurupoff; Robert F. Hess

[57] ABSTRACT

Method and apparatus for molding an elastomeric component of a shaft seal while bonding it to a fluorocarbon seal lip member. The lip member is initially shaped as a flat washer, and a radially outer portion is flexed during molding to a frustoconical shape. Positive retention of the fluorocarbon washer during molding is assured. Radially inner portion of the fluorocarbon washer rests on a planar annular mold ledge, its radially outer portion overhanging a frustoconical mold surface. A ring of uncured elastomer is located above that radially outer portion and radially inwardly from the outer periphery of the ledge. The radially inner portion has a horizontal toothed mold portion with a series of concentric sharp tooth edges. This directly engages the upper surface of the washer and clamps it firmly and immovably against the ledge. When the mold is closed, the elastomer flows and forces the outer portion of the washer down on frustoconical mold surface while bonding elastomer to washer.

15 Claims, 4 Drawing Figures

U.S. Patent  Nov. 26, 1985  Sheet 1 of 2  4,555,376
FIG. 1
FIG. 2
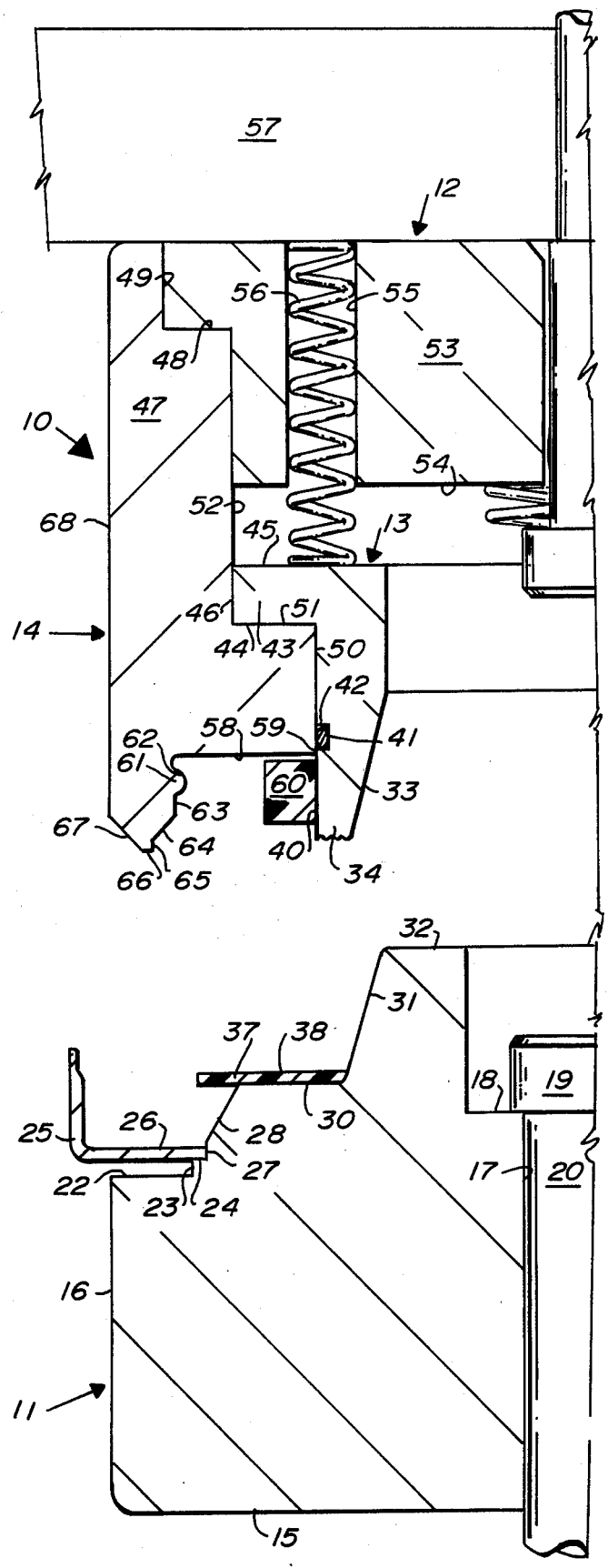
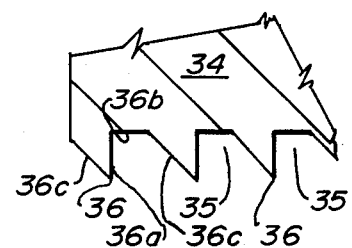

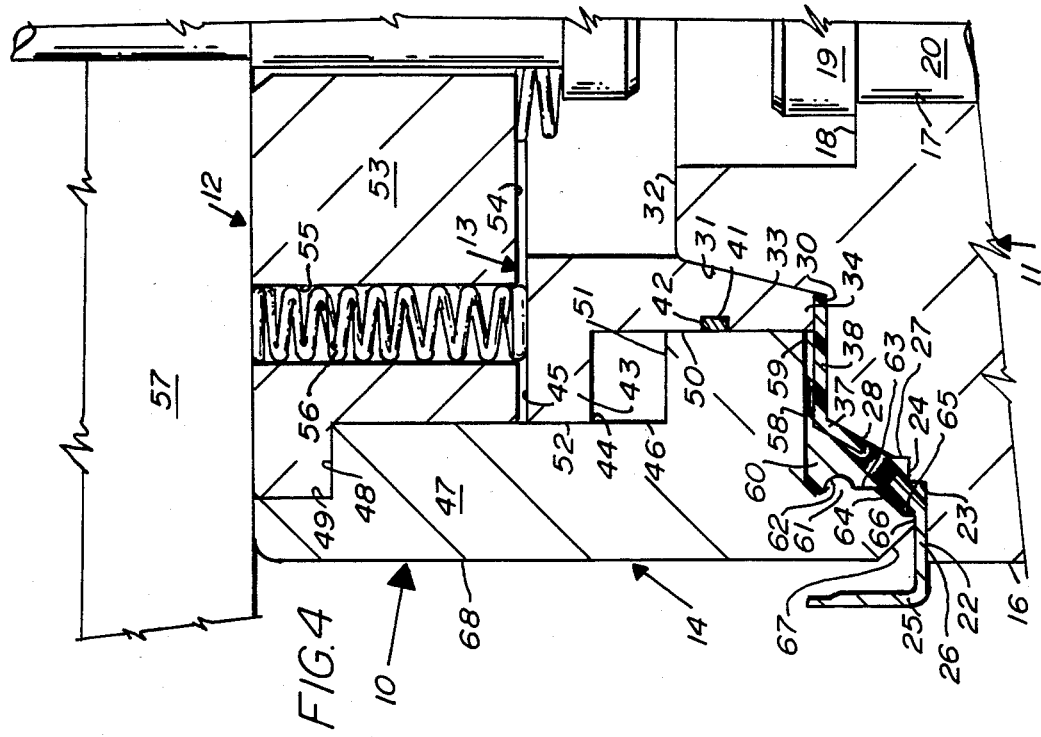
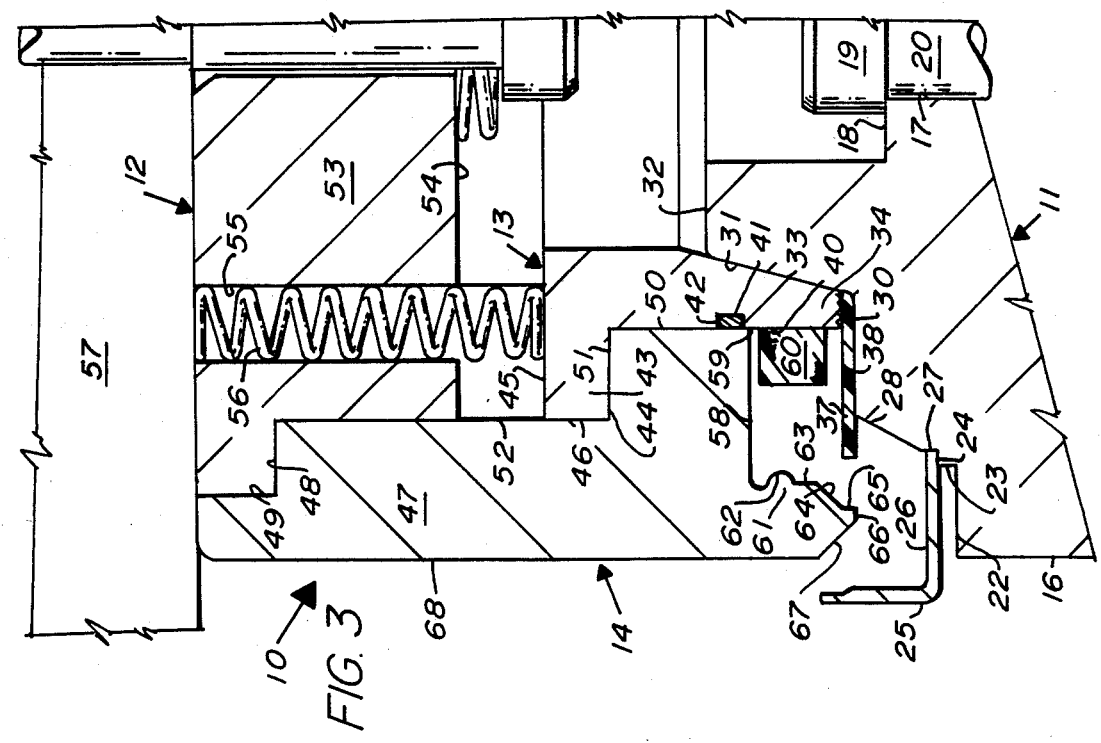

MOLDING AN ELASTOMERIC RING WHILE BONDING IT TO A METAL CASE AND TO A FLUOROCARBON WASHER

This invention relates to the molding of annular products incorporating a flat planar washer of polytetrafluoroethylene formed into at least partially frustoconical shape and bonded to an elastomer. It has both method and apparatus aspects.

BACKGROUND OF THE INVENTION

Polytetrafluoroethylene is a fluorocarbon which is widely used in shaft seals for sealing oil, grease, and other lubricants. It is usually advisable not to make any attempt to mold this material in the way in which most elastomers are molded in the shaft seal industry, but instead to use flat annular washers and to incorporate them in some manner into the shaft seal. It is known to form the washer into a partially frustoconical shape, and it is known to bond the washer to elastomer, which may itself be bonded to a metal case.

However, there have been problems in retaining true alignment of the polytetrafluoroethylene washer within the mold relative to the mold parts and the seal case during molding. Heretofore, the washer has normally been placed on a flat ledge with a portion overhanging a frustoconical portion of the mold, and then a ring of the uncured elastomer to be molded has generally been placed on top of it; upon mold closure the elastomer flows but at least a portion remains on top of the polytetrafluoroethylene washer. As a result, there is no direct contact between the upper mold member and the washer, so that there is no true positive retention of the washer in the mold; so it tends to slip out of alignment. The surface of the ledge on which it rests may be serrated, but since the upper mold member does not actually come against the washer and since it must transmit its pressure through a layer of elastomer, the retention is not always positive. As a result, the washer may be off center in the final molded product, or may in some other way lack the precision placement needed, all this simply because the washer was not positively controlled. Moreover, the positive control has not heretofore appeared to be feasible since the elastomer necessarily has to be molded and has to flow.

An object of the present invention is to assure positive retention of the fluorocarbon washer within the mold while the elastomer is being molded and bonded to it and while the fluorocarbon member is being shaped to have at least a partially frustoconical shape.

Another object of the invention is to provide a method in which the fluorocarbon member can be accurately retained on center during molding.

Another object of the invention is to provide a method and structure by which both sides of the fluorocarbon washer are directly engaged by mold members.

Another object is to provide that at least one of the mold members engaging the washer is provided with a surface which bites into the washer, and thereby assures its accurate retention.

SUMMARY OF THE INVENTION

The invention includes a method for molding an elastomeric component of a shaft seal while bonding it to a metal case and while bonding to the elastomer a fluorocarbon sealing member that is initially in the shape of a flat washer, while shaping a radially outer portion of the washer to a desired frustoconical shape during the molding. The method assures positive retention of the washer during molding.

A spring-loaded mold component of a compression mold engages the polytetrafluoroethylene washer and clamps it in place during mold closure and prior to complete closure and to elastomer flow. The action assures that the polytetrafluoroethylene washer will remain in its proper position during the molding operation.

The fluorocarbon washer is placed with its radially inner portion resting on a planar annular mold ledge and its radially outer portion overhanging a frustoconical mold surface. The ledge and the frustoconical surfaces are generally smooth, commonly having a mold surface finish of 10 to 20 RMS. Then a ring of uncured elastomer is located above the washer but spaced radially outwardly from the radially inner portion of the washer.

A toothed upper mold portion has a series of concentric, sharp radial grooves or serrations along an annular horizontal surface lying radially inwardly from the ring of elastomer and directly above the radially inner portion of the washer. During closure of the mold, this toothed upper mold portion descends and engages directly the upper surface of the washer with the sharp edges of the grooves; thereafter it clamps the washer firmly against the ledge behind it and holds it so that it cannot move in any way between the two clamping mold parts. This happens before the elastomer flows.

After the clamping engagement of the washer, closure of the mold continues, and the elastomer is then caused to flow and to force the outer portion of the fluorocarbon washer down on to a frustoconical mold surface, thereby shaping the washer while also bonding the elastomer to the washer. The elastomer also flows down upon and against the case and is bonded to it.

The invention also includes a mold for performing the molding method, i.e. for molding an elastomeric component of a shaft seal while bonding it to a metal case and to a fluorocarbon seal lip member that is initially in the shape of a flat washer and a portion of which is, during molding, flexed to a desired frustoconical shape. The mold assures positive retention of the fluorocarbon washer during molding.

A base molding member includes structure for holding the metal case in place during the molding operation. This may be done in various ways, as by providing a radially outer lowermost mold ledge joined by a step to a radially inner intermediate ledge. A radially inner portion of the radial flange of a metal case member may be initially placed upon the intermediate ledge; this radial flange will be bent during molding to help to close off the mold and to achieve bonding of elastomer to its inner portion. Being bent during mold closure, the flange takes on a frustoconical shape as its outer portion is forced down against the lowermost ledge.

This base molding member may also have a short vertical portion leading from the inner edge of the intermediate ledge to an upwardly and inwardly sloping first frustoconical mold surface which ends at an upper ledge. The upper ledge may extend radially inwardly to an inner, second frustoconical mold surface. Before molding, the fluorocarbon washer is placed on the upper ledge and its radially outer portion overlies the first frustoconical mold surface.

The mold has a two-part upper mold assembly having a first or inner mold member with an inner frustoconical wall which, upon mold closure, mates with the second frustoconical mold surface. It also has a lowermost generally horizontal toothed portion having a series of concentric sharp tooth edges for directly engaging the upper surface of the fluorocarbon washer and clamping it firmly and immovably against the upper ledge. This same mold member may have an inner generally vertical cylindrical portion leading up from the inner edge of the toothed portion to an upper outwardly extending flange. Preferably the vertical cylindrical portion has an annular recess with a sealing O-ring of polytetrafluoroethylene therein.

The second part of the upper mold assembly, which may be called an outer mold member, preferably has a generally vertical cylindrical inner wall engaging the vertical cylindrical portion and the O-ring of the inner member, to seal against passage of flash; a ledge at the upper end thereof is normally abutted by the outwardly extending flange of the inner mold member, with spring means urging the flange down against the ledge of the outer mold member.

This outer upper mold member also has a mold-cavity-defining lower surface and a downwardly extending portion for closing off the mold cavity, as by abutting the case's radial flange and forcing it down against the lowermost ledge while bending it.

The vertical cylindrical wall of the inner upper mold member extends down well below the lower surface of outer upper mold member and defines an annular corner portion against which a ring of uncured elastomer is placed just prior to molding, so that the elastomer lies radially outside the upper ledge and does not interfere with direct engagement of the fluorocarbon washer by the toothed portion of the inner upper mold member.

The mold, of course, is heated in a conventional manner to the molding and curing temperatures.

On mold closure, the upper mold assembly is forced down, and the toothed portion engages the radially inner portion of the fluorocarbon washer, bites into it, clamps it against the upper ledge of the base molding member and retains the washer against movement. From then on, the outer upper mold member moves down relatively to the inner upper mold member, overcoming the force of the spring means. It causes the elastomer to flow and closes off the mold cavity, as by the downwardly extending portion coming against the metal case. The flowing elastomer forces the outer portion of the fluorocarbon washer down onto the first frustoconical mold surface, and it is bonded to the elastomer while the elastomer is bonded to the case.

Other objects and advantages of the invention will appear on the following description of a preferred embodiment.

BRIEF DESCRIPTION OF THE DRAWINGS

In the drawings:

FIG. 1 is a view in elevation and section of approximately half of an annular mold for practicing the principles of the invention. The mold is shown in open position with the metal case, the fluorocarbon washer, and the elastomeric material loaded in place.

FIG. 2 is an enlargement of a portion of the mold showing the toothed surface.

FIG. 3 is a view similar to FIG. 1 with the mold in partially closed position.

FIG. 4 is a similar view of the fully closed mold.

DESCRIPTION OF A PREFERRED EMBODIMENT

The drawings show a mold 10 embodying the principles of the invention and enabling the practice of the method of the invention. The mold 10 is made up principally of a base mold member 11 and an upper mold assembly 12, which includes a first or generally inner mold member 13 and a second or generally outer mold member 14. FIG. 1 shows the mold 10 in its open position where it is easiest to see the details of structure. This particular mold 10 happens to be made for making a particular type elastomeric seal by what is known as the BUD reform method. Other methods for bonding the elastomer to the case may also be used, this embodiment being shown as one good example.

The base mold member 11 has a flat base 15 and a cylindrical outer periphery 16. It also has a cylindrical inner surface 17 with a step 18 against which an enlarged head 19 of a mold pin 20 bears. The pin 20 holds the base mold member 11 in a stationary position.

Moving inwardly from the outer cylindrical periphery 16, the base mold member 11 includes a lowermost ledge 22 ending in a step 23 leading up to a second ledge 24. As shown in FIG. 1 a seal case 25 has a radial flange 26 that is preferably seated initially on the second ledge 24 and overhangs the first ledge 22. This is in accordance with the BUD reform method and is not essential to the present invention, although desirable in many seals. The radially inner end of the second ledge 24 is joined by an upward step or cylindrical portion 27 to a frustoconical mold surface 28 which leads upwardly and inwardly to an upper ledge 30. If desired, the surface 28 and the ledge 24 may have a serrated surface, but they may be smooth as illustrated here. The upper ledge 30 in turn leads to a tapered inner mold surface 31 which may also be frustoconical, and that, in turn, terminates at an upper flat mold surface 32.

The inner mold member 13 of the upper mold assembly 12 has a tapered or frustoconical surface 33 joined at its lower edge to a generally horizontal portion 34, which is important in this invention. This portion 34 has a series of grooves 35 with sharp edges 36 (see FIG. 2). Preferably, these grooves 35 are concentric rather than being made as a spiral thread, although that can be used in a less perfect form of the invention. The preferable shape is illustrated in FIG. 2: End groove 35 has a radially outer cylindrical wall 36a leading to a sharp edge 36; a flat annular wall 36b connects the cylindrical wall 36a to a frustoconical wall 36c leading to the next inner edge 36. The edges 36 are intentionally made sufficiently sharp so that they can bite into and indent on the upper surface 37 of a polytetrafluoroethylene washer 38, although they should not be so sharp as to actually cut through the washer 38, and therefore they may be somewhat blunted.

The radially outer end of this grooved retention portion 34 terminates at a cylindrical wall 40 in which is a square-cut rectangular recess 41 to retain a rectangular cross-section O-ring 42, preferably of polytetrafluoroethylene and completely filling the recess so that, owing to the greater thermal expansion of the polytetrafluoroethylene o-ring as compared with the thermal expansion of the adjacent mold members 13 and 14, no flash from the molding operation will be permitted to flow from the mold cavity beyond the polytetrafluoroethylene O-ring 42. Therefore, preferably the outer diameter of the O-ring 42 matches exactly the outer diameter of the wall 40 and the inner diameter there of the mold member 14. The wall 40 leads up to a radially outwardly extending flange 43 having a lower surface 44, an upper surface 45, and an outer cylindrical rim 46.

The outer member 14 of the upper mold assembly 12 is provided with an inner cylindrical surface 50 that closely abuts, but is movable vertically relative to the outer cylindrical wall 40 of the inner mold member 13, passage of flash between the walls 40 and 50 being prevented by the O-ring 42. The upper end of the wall 50 ends at a ledge 51, which is normally engaged by the lower surface 44 of the radially outwardly extending flange 43, and it is succeeded by a cylindrical portion 52 which is quite a bit higher than the thickness of the flange 43.

The mold member 14 is preferably made in two pieces, an outer member 47 having an upper ledge 48 and an annular wall 49 thereabove, and an inner member 53, which originally has a slightly larger outer diameter than what is shown and is shrunk fit onto the outer member 47, so that from there on, the members 47 and 53 act as a single element. The portion 53 preferably has a lower planar wall 54 and a series of spring receiving recesses or openings 55. Mechanical springs 56 are generally preferred, but hydraulic springs may be used if desired. The upper end of each spring 56 is retained in place by a mold closure member 57 of the mold pressure, while the lower end of each spring 56 abuts against the upper surface 45 of the mold member 13. Thus, the springs 56 normally urge the flange 43 down against the ledge 51, while they also enable relative vertical movement between the two mold members 13 and 14.

The close fit of the cylindrical surfaces 40 and 50 and the presence of the O-ring 42 prevents flash from getting in between the two mold members 13 and 14.

The bottom of the outer mold member 14 may include an outer outwardly extending generally planar surface 58 leading from the inner cylindrical surface 50. It may, if desired, be somewhat shaped. This surface 58 normally as shown in FIG. 1, is, well above the toothed surface 34, and therefore the meeting of the two mold members 13 and 14 results in a corner 59 which extends annularly around the mold and in which a ring 60 uncured elastomer is placed, as shown in FIG. 1, when the mold 10 is loaded.

The frustoconical washer 37 is, during mold loading, placed on top of the ledge 30 with its inner end abutting the tapered surface 31, while its outer portion extends well beyond the ledge 30 and overhangs the frustoconical portion 28.

The particular outer mold member 14 shown in the drawings has its planar surface 58 lead to a generally vertical portion 61 with an arcuate bead 62 to provide the molded elastomeric body with a recess for a garter string. Succeeding the bead 62, the portion 61 has a vertical cylindrical portion 63 leading to a short frustoconical portion 64 that leads, in turn, to a short vertical portion 65 which leads to a bottommost annular part 66 of the mold member 14. Outside this, a frustoconical portion 67 may lead up to a radially outer cylindrical periphery 68 of the member 14.

As noted before, a mold closure member 57 is provided up above the upper mold assembly 12 and bears against the springs 56; the member 57 is moved by the usual hydraulic apparatus, or if desired, by mechanical apparatus, to force the mold 10 to close.

FIG. 1 shows the mold 10 loaded with the seal case 25 in place on the second ledge 24, the fluorocarbon washer 37 in place on its ledge 30, and the uncured elastomer ring 60 in place at the corner 59 provided where the outer cylindrical wall 40 of the inner mold member 13 meets the bottom surface 58 of the outer mold member 14.

In the next stage, the mold 10 is closed, and the first thing that happens is direct engagement of the upper surface 38 of the polytetrafluoroethylene washer 37 by the toothed surface 34 of the inner mold member 13 of the upper assembly 12. Although the mold 10 is heated, there is nothing yet to cause the elastomer 60 to flow; so this engagement of the washer 37 is made before any elastomer can intervene between the parts. Thus, the radially inner portion of the washer 37 is firmly clamped between the two mold surfaces 30 and 34, From now on, the inner mold member 12 remains stationary, and the inner portion of the washer 40 cannot move, and so remains aligned. The radially outer portion will be moved, but this movement will not effect the washer's alignment in the mold 10.

The downward movement of the inner member 14 of the upper mold assembly 12 continues, and the next thing that happens is that the bottommost surface 66 engages the flange 26 of the seal case 25 and begins to force it downwardly. At about the same time, the lower surface of the elastomeric ring 60 comes against the upper surface of the washer 37, and the elastomer begins to flow. It cannot, however, flow fast enough to beat the closure of the upper mold member 14 against the case 25 so that there is no flow outside the mold cavity.

Further downward movement of the member 14 exerts very high pressure against the inner part of the case's radial flange 26 and causes its outer portion to move downwardly, leaving the inner portion as an angularly extending portion to which the elastomer 60 will be bonded. The elastomer 60 continues to flow until it fills the cavity, including abutment with the radial flange 26. During this movement it forces an outer radial portion of the fluorocarbon washer 37 down against the frustoconical mold surface 28 and, of course, maintains very strong contact under pressure so that bonding becomes simple. Usually the radially outer portion of the washer 37 is treated in advance, as by etching by acid and by application of a bonding cement, and the inner portion of the case's radial flange 26 is also treated with a suitable bonding cement to aid in the bonding action.

Once closed, the mold 10 remains closed until curing of the elastomer is completed, and then the upper assembly 12 is raised and the molded product is taken out of the mold. A conventional ejector may be used to eject the seal from the lower mold member 11 or a conventional stripper may be used to strip the seal from the upper member 14, depending on which part the seal tends to remain with. After that, it is trimmed to provide the product.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A mold comprising:
    a base molding member having a radially outer case-supporting portion and, spaced inwardly and away therefrom, a sloping frustoconical mold surface which ends at an inwardly extending upper ledge, a two-part upper mold assembly having first and second mold members, said first mold member having a lowermost generally horizontal toothed portion with a series of concentric sharp tooth edges in line with the radially inward portion of said ledge, and a cylindrical wall portion leading up from the outer edge of the toothed portion to an upper radially outwardly extending flange having a lower surface and an upper surface, said second mold member having a cylindrical inner wall engaging the cylindrical wall portion of said first mold member, a ledge at the upper end thereof against which the lower surface of said outwardly extending flange can abut, a spacing means leading from the outer edge of said ledge to an upper radially inwardly extending surface, spring means engaging said upper surface of said first upper mold member and urging it down against said ledge of said second mold member, but compressible so that said second mold member can move down relative to said first mold member after said first mold member bottoms against said upper ledge of said base molding member, said second upper mold member also having a mold-cavity-defining lower surface lying radially outwardly from its said cylindrical inner wall and extending downwardly for closing off said mold cavity, said cylindrical wall portion of said first mold member normally extending down well below the lower extremity of the cylindrical inner wall of said second mold member and defining an annular corner portion against which a ring of uncured elastomer is placed just prior to molding, and mold closing means for forcing said upper mold assembly down to bottom said toothed portion and forcing said second mold member down relatively to said first mold member against the pressure of said spring means.

2. The mold of claim 1 wherein there is flash-preventing means between said first mold member's cylindrical portion and said cylindrical inner wall of said second mold member for preventing flow of material between them.

3. The mold of claim 2 wherein said flash-preventing means comprises an annular recess, rectangular in cross-section, in said cylindrical portion of said first mold member and a polytetrafluoroethylene O-ring, rectangular in cross-section, in and completely filling said recess and with its outer periphery matching exactly the inner periphery of said cylindrical inner wall of said second mold member.

4. The mold of claim 1 wherein said series of concentric sharp tooth edges comprises each said edge having a radially inner vertical wall and a radially outer frustoconical wall.

5. A mold for molding an elastomeric component of a shaft seal while bonding it to a metal case and to a fluorocarbon seal lip member that is initially in the shape of a flat washer and a portion of which is, during molding, flexed to a desired frustoconical shape, said mold assuring positive retention of the fluorocarbon washer during molding, comprising:

a base molding member having a case-supporting portion and, spaced away therefrom, an inwardly sloping frustoconical mold surface which ends at an inwardly extending upper ledge, said fluorocarbon washer being placed on said upper ledge prior to molding and overhanging said frustoconical mold surface, a two-part upper mold assembly having a first mold member with a lowermost generally horizontal toothed portion having a series of concentric sharp tooth edges for directly engaging the upper surface of said fluorocarbon washer and clamping it firmly and immovably against said upper ledge and a radially outer generally vertical cylindrical portion leading up from the outer edge of said toothed portion to an upper radially outwardly extending flange having a lower surface, an upper surface and an outer cylindrical rim, said vertical cylindrical portion having an annular recess with a sealing O-ring therein, said upper mold assembly also having a second mold member having a generally vertical cylindrical inner wall engaging said vertical cylindrical portion and said O-ring to seal against passage of flash, a ledge at the upper end thereof against which the lower surface of said outwardly extending flange can abut, a cylindrical portion abutting said outer cylindrical rim of said outwardly extending flange and extending beyond the upper surface of said outwardly extending flange a substantial distance, and an upper radially inwardly extending surface, having axially extending openings therethrough, with spring means in said openings for engaging said upper surface of said first upper mold member and urging it down against said ledge of said second mold member, said second upper mold member also having a mold-cavity-defining lower surface extending radially outwardly from said cylindrical inner wall and a downwardly extending portion for closing off said mold cavity, said vertical cylindrical wall of said first upper mold member extending down below the lower surface of said second upper mold member and defining an annular corner portion against which a ring of uncured elastomer is placed just prior to molding, so that the elastomer does not interfere with said direct engagement of said fluorocarbon washer by the toothed portion of said first upper mold member, heating means for heating said mold members to molding and curing temperatures, and mold closing means for forcing said upper mold assembly down so that said toothed portion first engages the radially inner portion of said fluorocarbon washer and bites into it and retains it against movement while said mold closing means forces said second mold member down relatively to said first mold member, overcoming the pressure of said spring means, causing said elastomer to flow and closing off the mold cavity, while forcing the outer portion of said fluorocarbon washer down on said first frustoconical mold surface where the frustoconical portion of said washer is bonded to said elastomer.

6. The mold of claim 5 wherein said annular recess is rectangular in cross-section and said sealing O-ring is rectangular in cross-section and completely fills said recess and matches in periphery the inner periphery of said cylindrical inner wall of said second mold member.

7. The mold of claim 6 wherein said sealing O-ring is made of polytetrafluoroethylene.

8. The mold of claim 5 wherein said series of concentric sharp tooth edges comprises each said edge having a radially inner vertical wall and a radially outer frustoconical wall.

9. A mold comprising:
a base molding member having an inwardly sloping first frustoconical mold surface which ends at an inwardly extending upper ledge for holding a fluorocarbon washer therein,
a movable two-part upper mold assembly, having an inner mold member and an outer mold member,
said inner mold member having a lowermost generally horizontal toothed portion aligned with a radially inner portion of said upper ledge and having a series of concentric sharp tooth edges,
said outer mold member being mounted for vertical movement relative to said inner mold member with yieldable means between said inner and outer mold members for urging said inner mold member downwardly relative to said outer mold member
said outer mold member also having a mold-cavity-defining lower surface and a downwardly extending portion for closing off said mold cavity,
means on said upper mold assembly for retaining a ring of uncured elastomer radially outwardly from said upper ledge, so that the elastomer does not interfere with direct engagement of said fluorocarbon washer by the toothed portion of said inner mold member, and
mold closing means for forcing said upper mold assembly down so that said toothed portion engages and bites into the radially inner portion of said fluorocarbon washer and retaining it against movement, said mold closing means then forcing said outer mold member down relatively to said inner mold member, overcoming the pressure of said yieldable means, and closing off the mold cavity.

10. The mold of claim 9 having flash flow preventing means between said inner and outer mold members.

11. The mold of claim 10 wherein said flash preventing means comprises mating, relatively slidable cylindrical walls on both the inner and outer mold members, a rectangular shaped annular recess in one said wall, and a rectangular O-ring completely filling said recess and made from a material having greater thermal expansion than the material from which the inner and outer mold members are made.

12. A mold for molding an elastomeric component of a shaft seal while bonding it to a fluorocarbon seal lip member that is initially in the shape of a flat washer and a portion of which is, during molding, flexed to a desired frustoconical shape, said mold assuring positive retention of the fluorocarbon washer during molding, comprising
a base molding member having an inwardly sloping first frustoconical mold surface which ends at an inwardly extending upper ledge, said fluorocarbon washer being placed on said upper ledge prior to molding and overhanging said frustoconical mold surface,
a movable two-part upper mold assembly having an inner mold member and an outer mold member,
said inner mold member having a lowermost generally horizontal toothed portion having a series of concentric sharp tooth edges for directly engaging the upper surface of said fluorocarbon washer and clamping it firmly and immovably against said upper ledge
said outer mold member being mounted for vertical movement relative to said inner mold member with yieldable means between said inner and outer mold members for urging said inner mold member downwardly relative to said outer mold member
said outer mold member also having a mold-cavity-defining lower surface and a downwardly extending portion for closing off said mold cavity,
means on said upper mold assembly for retaining a ring of uncured elastomer radially outwardly from said upper ledge, so that the elastomer does not interfere with said direct engagement of said fluorocarbon washer by the toothed portion of said inner mold member,
heating means for heating said mold members to molding and curing temperatures, and
mold closing means for forcing said upper mold assembly down so that said toothed portion first engages the radially inner portion of said fluorocarbon washer and bites into it and retains it against movement while said mold closing means forces said outer mold member down relatively to said inner mold member, overcoming the pressure of said yieldable means, causing said elastomer to flow, closing off the mold cavity, and forcing the outer portion of said fluorocarbon washer down on said frustoconical mold surface where its frustoconical portion is bonded to said elastomer.

13. A mold for molding an elastomeric component of a shaft seal while bonding it to a metal case and to a fluorocarbon seal lip member that is initially in the shape of a flat washer and a portion of which is, during molding, flexed to a desired frustoconical shape, said mold assuring positive retention of the fluorocarbon washer during molding, comprising
a base molding member having a lowermost mold ledge joined by a step to an intermediate ledge for initial placement upon said intermediate ledge of a radial flange of a case member, said radial flange being bent during molding to help to close off said mold and to achieve bonding of elastomer to the inner portion of said radial flange which is bent, during mold closure, to a frustoconical shape, the outer portion of said radial flange thereby being forced down against said lowermost ledge, said base molding member also having a short vertical portion leading from the inner edge of said intermediate ledge to an upwardly and inwardly sloping first frustoconical mold surface which ends at an upper ledge, said upper ledge extending inwardly to an inner, second frustoconical mold surface, said fluorocarbon washer being placed on said upper ledge prior to molding and overhanging and frustoconical mold surface,
a two-part upper mold assembly having a first upper mold member with a radially inner frustoconical wall which, upon mold closure, mates with said second frustoconical mold surface, a lowermost generally horizontal toothed portion having a series of concentric sharp tooth edges for directly engaging the upper surface of said fluorocarbon washer and clamping it firmly and immovably against said upper ledge, a radially outer generally vertical cylindrical portion leading up from the inner edge of said toothed portion to an upper radially outwardly extending flange having a lower surface and an upper surface, said vertical cylindrical portion having an annular recess with a sealing O-ring therein filling said recess and made of material having greater expansion than the material from which the mold assembly is made, said upper mold assembly also having a second mold member having a generally vertical cylindrical inner wall engaging said vertical cylindrical portion and said O-ring to seal against passage of flash, a ledge at the upper end thereof against which said outwardly extending flange abuts, a cylindrical surface at the outer periphery of said outwardly extending flange and considerably higher than the thickness of said flange, and an upper radially inwardly extending surface, having axially extending openings therethrough, with spring means in said openings for engaging said upper surface of said first upper mold member and to urge it down against said ledge of said second mold member, said second upper mold member also having a mold-cavity-defining lower surface and a downwardly extending portion for abutting said case's radial flange during mold closure forcing it down against said lowermost ledge, and for closing off said mold cavity, said vertical cylindrical wall of said first upper mold member extending down below the lower surface of said second upper mold member and defining an annular corner portion against which a ring of uncured elastomer is placed prior to molding, so that the elastomer does not interfere with said direct engagement of said fluorocarbon washer by the toothed portion of said first upper mold member, heating means for heating said mold members to molding and curing temperatures, and mold closing means for forcing said upper mold assembly down so that said toothed portion engages the radially inner portion of said fluorocarbon washer and bites into it and retains it against movement while said mold closing means then forces said second mold member down relatively to said first mold member, overcoming the pressure of said spring means, causing said elastomer to flow and forcing said downwardly extending portion against said metal case to close off the mold cavity, forcing the outer portion of said fluorocarbon washer down on said first frustoconical mold surface and to bond said washer to said elastomer.

14. A method for molding an elastomeric component of a shaft seal while bonding it to a metal case and a fluorocarbon seal lip member while shaping the fluorocarbon seal lip member that is initially in the shape of a flat washer having a radially inner portion and a radially outer portion, so that said radially outer portion is, during molding, flexed to a desired frustoconical shape, said method assuring positive retention of the fluorocarbon washer during molding, comprising:

emplacing said fluorocarbon washer with said radially inner portion thereof resting on a stationary planar annular mold ledge and said radially outer portion thereof over-hanging a frustoconical mold surface, seating an annular metal case on an outer stationary portion of said mold, locating a ring of uncured elastomer on a movable mold member above the radially outer portion of said washer and radially inwardly from the outer periphery of said planar annular ledge, engaging the radially inner portion of said washer with a relatively movable generally horizontal mold portion, at least one of said planar annular mold ledge and said generally horizontal mold portion having a series of sharp tooth edges, directly engaging said radially inner portion of said fluorocarbon washer on at least one surface thereof with said edges and clamping it in direct engagement firmly and immovably between said annular planar ledge and said generally horizontal mold portion, and closing the mold while causing said elastomer to flow against said case and to flow against and to force said radially outer portion of said fluorocarbon washer onto said frustoconical mold surface while bonding said elastomer to said washer.

15. A method for molding an elastomeric component of a shaft seal while bonding it to a fluorocarbon seal lip member that is initially in the shape of a flat washer having a radially inner portion and a radially outer portion, said radially outer portion of said washer being flexed during molding to a desired frustoconical shape, said method assuring positive retention of the fluorocarbon washer during molding, comprising emplacing said fluorocarbon washer with said radially inner portion thereof resting on a planar annular mold ledge and said radially outer portion thereof overhanging a frustoconical mold surface, locating a ring of uncured elastomer having the radially outer portion of said washer and radially inwardly from the outer periphery of said ledge, engaging said radially inner portion of said washer with a generally horizontal toothed mold portion having a series of concentric sharp tooth edges, directly engaging the upper surface of said fluorocarbon washer with said edges and clamping it firmly and immovably against said ledge, and closing the mold while causing said elastomer to flow and to force the outer portion of said fluorocarbon washer down on said frustoconical mold surface while bonding said elastomer to said washer.

* * * * *

UNITED STATES PATENT AND TRADEMARK OFFICE
CERTIFICATE OF CORRECTION

PATENT NO.   :   4,555,376
DATED        :   November 26, 1985
INVENTOR(S)  :   John D. Butler It is certified that error appears in the above-identified patent and that said Letters Patent is hereby corrected as shown below:

Column 5, line 27, "pressure" should read "press".
Column 12, line 43, "having" should read "above".

Signed and Sealed this

Twenty-eighth Day of October, 1986

[SEAL]

*Attest:*

DONALD J. QUIGG

*Attesting Officer*     *Commissioner of Patents and Trademarks*